(12) United States Patent
Choi et al.

(10) Patent No.: US 11,366,030 B2
(45) Date of Patent: Jun. 21, 2022

(54) FLEXIBLE TACTILE SENSORS

(71) Applicants: Jae-Won Choi, Copley, OH (US); Md. Omar Faruk Emon, Akron, OH (US)

(72) Inventors: Jae-Won Choi, Copley, OH (US); Md. Omar Faruk Emon, Akron, OH (US)

(73) Assignee: The University of Akron, Akron, OH (US)

( * ) Notice: Subject to any disclaimer, the term of this patent is extended or adjusted under 35 U.S.C. 154(b) by 298 days.

(21) Appl. No.: 16/678,030

(22) Filed: Nov. 8, 2019

(65) Prior Publication Data

US 2020/0200623 A1 Jun. 25, 2020

Related U.S. Application Data

(60) Provisional application No. 62/768,199, filed on Nov. 16, 2018.

(51) Int. Cl.
| | |
|---|---|
| *G01L 1/22* | (2006.01) |
| *G01H 17/00* | (2006.01) |
| *C08K 3/04* | (2006.01) |
| *G01L 1/18* | (2006.01) |
| *G01H 11/06* | (2006.01) |
| *B82Y 40/00* | (2011.01) |
| *B82Y 15/00* | (2011.01) |
| *B82Y 30/00* | (2011.01) |

(52) U.S. Cl.
CPC ............ *G01L 1/2287* (2013.01); *C08K 3/041* (2017.05); *C08K 3/042* (2017.05); *C08K 3/046* (2017.05); *G01H 11/06* (2013.01); *G01H 17/00* (2013.01); *G01L 1/18* (2013.01); *B82Y 15/00* (2013.01); *B82Y 30/00* (2013.01); *B82Y 40/00* (2013.01); *C08K 2201/001* (2013.01); *C08K 2201/004* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 6,878,255 | B1 | 4/2005 | Wang et al. |
| 10,156,487 | B2 | 12/2018 | Choi et al. |
| 2008/0054875 | A1 | 3/2008 | Saito |
| 2009/0148967 | A1 | 6/2009 | Wodnickl et al. |
| 2010/0288635 | A1* | 11/2010 | Komiya ............... G01B 7/16 204/406 |
| 2013/0134410 | A1 | 5/2013 | Kim |
| 2014/0293150 | A1 | 10/2014 | Tang et al. |
| 2015/0109006 | A1* | 4/2015 | Choi ................... G01L 1/04 324/691 |

FOREIGN PATENT DOCUMENTS

WO   2013163549 A1   10/2013

\* cited by examiner

*Primary Examiner* — Katie L. Hammer
(74) *Attorney, Agent, or Firm* — Renner Kenner Greive Bobak Taylor & Weber

(57) ABSTRACT

A tactile sensor including a first insulating layer, an intermediate layer of conductive soft polymer material, and a second insulating layer. The intermediate layer includes first and second electrically conductive strips located therein and the intermediate layer is positioned above the first insulating layer. The first and second electrically conductive strips are located within the same horizontal plane within the intermediate layer and the first and second electrically conductive strips are connected to an impedance measuring device.

16 Claims, 3 Drawing Sheets

FLEXIBLE TACTILE SENSORS

CROSS-REFERENCE TO RELATED APPLICATIONS

This application claim priority from U.S. Provisional Application No. 62/768,199 entitled "Tactile Sensors for Measuring Shear Force" filed on Nov. 16, 2018, the contents of which are incorporated herein by reference.

FIELD OF THE INVENTION

Embodiments of the present invention relate to force measuring sensors and methods of fabricating the same. Particularly, embodiments of the present invention relate to the use of force sensors that utilizes multiple sensing elements that are arranged in an array to measure changes in force across a surface. More particularly, embodiments of the present invention relate to force measuring sensors that are arranged in a manner in which both shear and normal forces can be measured.

BACKGROUND OF THE INVENTION

There have been notable advances in the design and development of artificial robotic hands over the last several decades. The Utah/M.I.T. hand was developed over twenty years ago with three fingers and a thumb. More recently, the Gifu hand and the Shadow Hand have been developed with high levels of dexterity. Because the dexterity of these artificial hands is approaching that of human hands, tactile sensing is very important for the development of intelligent grasp control algorithms. Tactile sensing is also very important in upper limb prosthetics, where a number of mechanical advances have also been recently made. For example, the i-Limb has four fingers and a thumb with one motor for each digit. The Smarthand and Michelangelo hand also have five fingers.

One general problem for upper limb amputees is that they lack proprioceptive feedback about the grip force applied by their prostheses. For this reason, amputees are more likely to drop grasped objects because they do not know exactly how tightly the object is grasped. This is corroborated by recent surveys from amputees which indicate their desire for a level of automatic grasped object slip prevention. However, the detection and prevention of grasped objects from slipping is a difficult problem in general that is important not only for prosthetic hands but also for autonomous robots.

There are several approaches to enhance the flexibility of tactile sensors. The flexibility of silicon-diaphragm sensors can be increased through the incorporation of polymers during the fabrication process. Mounting the sensors on a flexible substrate or using polyimide layers as a connecting material between silicon-diaphragm sensors can also increase the flexibility of the sensors. Another approach is the use of compressible and flexible conductive sheets as a sensing material to increase the size and flexibility of tactile sensors. With this previous approach, flexible sheets are sandwiched by conductive strips. Although these sensors provide good flexibility in a large area, their response, spatial resolution, and sensor size on a large area are limited. Control of dimensions of sensors and sensor elements during the fabrication process is another limitation.

Therefore, there is a need for a force sensor that includes an array of discrete force sensing elements that is able to achieve any desired level of force sensing resolution that is capable of wireless communication to provide real-time, or near real-time telemetry as they relate to both shear and normal force.

SUMMARY OF THE INVENTION

In a first embodiment, the present invention provides a tactile sensor comprising: a first insulating layer; an intermediate layer of conductive soft polymer material having a first and second electrically conductive strip located therein and wherein said intermediate layer is positioned above said first insulating layer; and a second insulating layer positioned above said intermediate layer, wherein said first and second electrically conductive strips are located within a first horizontal plane within the intermediate layer and wherein both the first and second electrically conductive strips are connected to a first impedance measuring device In a second embodiment, the present invention provides a tactile sensor as in any embodiment above, wherein said first and second electrically conductive strips include conductive nanostructures dispersed in a flexible support material, wherein said conductive nanostructures are selected from the group consisting of conductive nanowires, carbon nanotubes, and graphene, and wherein said carbon nanotubes are selected from the group consisting of multi-walled carbon nanotubes or single wall carbon nanotubes.

In a third embodiment, the present invention provides a tactile sensor as in any embodiment above, wherein said electrically conductive strips contain from 0.01 wt % to 20 wt % carbon nanotubes and wherein said carbon nanotubes have an average length from 300 nanometers to 30 microns.

In a fourth embodiment, the present invention provides a tactile sensor as in any embodiment above, wherein the conductive soft polymer of the intermediate layer is selected from the group consisting of ionic-liquid polymers, particle based soft conductive polymers, and soft polymer having intrinsic conductivity.

In a fifth embodiment, the present invention provides a tactile sensor as in any embodiment above, wherein the conductive soft polymer is an ionic liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl) imide (EMITFSI) with the Tg of −98.15° C.; and 1-butylpyridinium tetrafluoroborate (BPBF4) with the Tg of −66.7° C.

In a sixth embodiment, the present invention provides a tactile sensor as in any embodiment above, wherein the weight percent of the ionic liquid based upon the total weight of the ionic liquid polymer within the intermediate layer is selected from the group consisting of from 0.01 or more to 10 or less weight percent (wt %) of ionic liquid, from 0.05 or more to 7.5 or less weight percent (wt %) ionic liquid, from 0.5 or more to 5 or less weight percent (wt %) ionic liquid, and from 1 or more to 2.5 or less weight percent (wt %) ionic liquid.

In a seventh embodiment, the present invention provides a tactile sensor as in any embodiment above, wherein the ionic liquid polymer is a pressure sensitive polymer.

In a eighth embodiment, the present invention provides a tactile sensor as in any embodiment above, wherein the impedance measuring device is a voltage divider.

In a ninth embodiment, the present invention provides a tactile sensor as in any embodiment above, wherein said first insulating layer and said second insulating layer is stretchable.

In a tenth embodiment, the present invention provides a tactile sensor as in any embodiment above, wherein said first insulating layer and said second insulating layer comprise material selected from group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorolastomers, polyether block amines, chlorosulfonated polyethylene, ethylene-vinyl acetate, thermoplastic elastomer, polyurethane, and mixtures thereof, and wherein said material of said first insulating layer can be the same or different than the material of the second insulating layer.

In a eleventh embodiment, the present invention provides a tactile sensor as in any embodiment above, wherein the tactile sensor detects: applied force such as normal and shear forces, the proximity of the applied force, slip events, slip direction, slip speed, slip velocity, temperature changes, rolling contact, the shape of an object in contact with said tactile sensor, and vibration.

In a twelfth embodiment, the present invention provides a tactile sensor as in any embodiment above, further comprising a third electrically conductive strip located within the intermediate layer, wherein said third electrically conductive strip is located within a second horizontal plane, and wherein said second horizontal plane is different than said first horizontal plane.

In a thirteenth embodiment, the present invention provides a tactile sensor as in any embodiment above, wherein said first electrically conductive strip and said third electrically conductive strip are connected to a second impedance measuring device and wherein said second electrically conductive strip and said third electrically conductive strip are connected to a third impedance measuring device.

In a fourteenth embodiment, the present invention provides a method of making a tactile sensor, comprising: (a) preparing a first layer by pouring a first insulating soft polymer material into a first mold; (b) curing the insulating soft polymer material to from the first layer; (c) preparing a second layer by: (i) depositing a mixture of prepolymer and carbon nanotubes into a second mold on top of the first layer to form a first array of conductive strips; (ii) curing the first array conductive strips; (iii) pouring a conductive soft polymer material into the second mold to cover the first array of conductive strips to form; (iv) curing the conductive soft polymer material to form the second layer; (d) preparing a third layer by pouring a second insulating soft polymer material into a third mold on top of the second layer; and (e) curing the second insulating soft polymer material to form the third layer.

In a fifteenth embodiment, the present invention provides a method of making a tactile sensor as in any embodiment above, wherein the mixture of prepolymer and carbon nanotubes is deposited via a micro-dispensing head, or screen printing and wherein the deposited mixture is directly cured into strips using UV light or thermal curing.

In a sixteenth embodiment, the present invention provides a method of making a tactile sensor as in any embodiment above, wherein the conductive soft polymer is selected from the group consisting of ionic-liquid polymer, particle based soft conductive polymers, and soft polymers having intrinsic conductivity.

In a seventeenth embodiment, the present invention provides a method of making a tactile sensor as in any embodiment above, wherein the conductive soft polymer is an ionic-liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl)imide (EMITFSI) with the Tg of −98.15° C.; and 1-butylpyridinium tetrafluoroborate (BPBF4) with the Tg of −66.7° C.

In an eighteenth embodiment, the present invention provides a method of making a tactile sensor as in any embodiment above, wherein said first insulating soft polymer material and said second insulating soft polymer material comprise material selected from group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorolastomers, polyether block amines, chlorosulfonated polyethylene, ethylene-vinyl acetate, thermoplastic elastomer, polyurethane, and mixtures thereof, and wherein said first insulating soft polymer material can be the same or different than the second insulating soft polymer material.

DETAILED DESCRIPTION OF ILLUSTRATIVE EMBODIMENTS

The present invention relates to tactile sensors and to methods of making them. In some embodiments, the present invention further relates to tactile sensors that are developed using direct-write technology to lay down, within a flexible medium, multiple conductive strips of electrically conductive carbon nanotubes mixed within a polymer matrix.

Figure 1A:
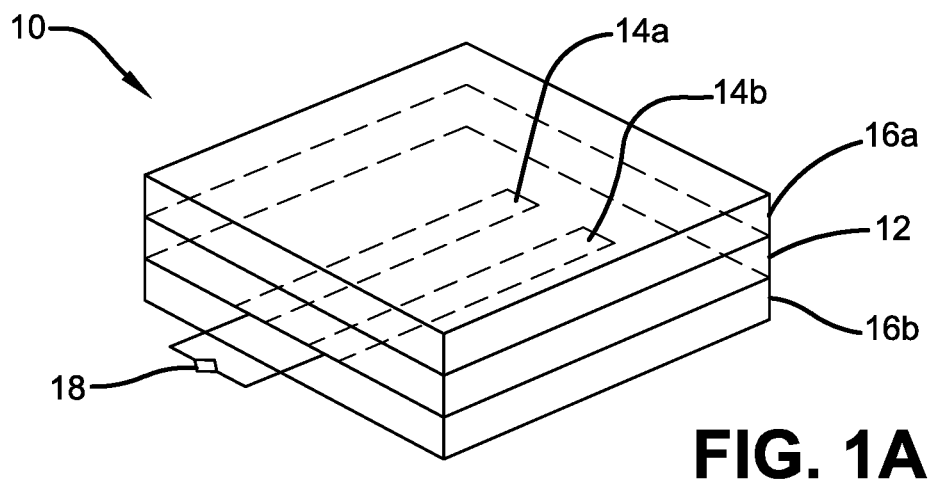
FIG. 1A is a schematic view of one embodiment of a tactile sensor of the present invention comprising two insulating layers and two conductive strips located within an intermediate layer positioned between the two insulating layers.
Figure 1B:
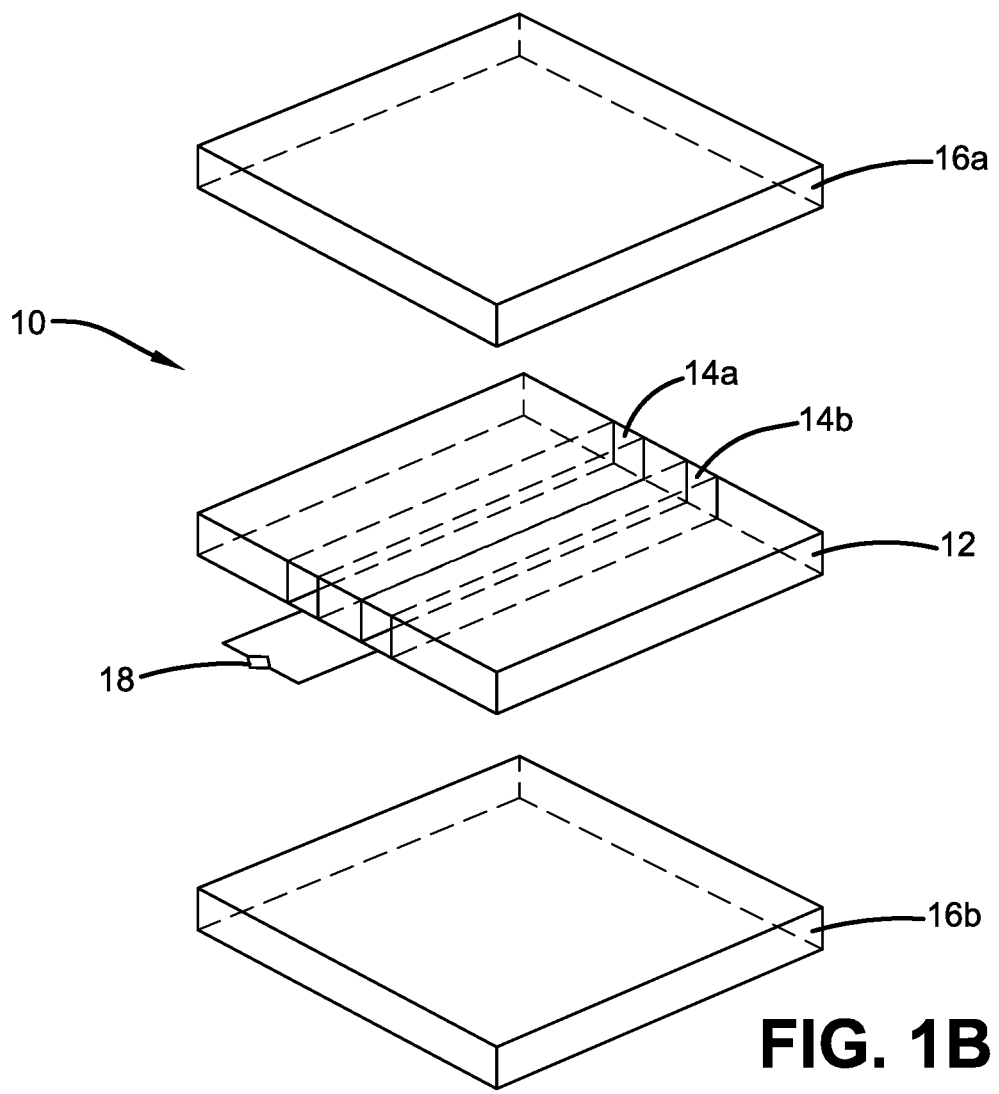
FIG. 1B is an exploded schematic view of the tactile sensor of FIG. 1A.

With reference to FIGS. 1A and 1B, one embodiment of the present invention provides a tactile sensor 10 comprising electrically conductive strips 14a and 14b, two insulating layers 16a and 16b, and an intermediate layer 12. The electrically conductive strips 14a and 14b can be aligned as straight strips, two-dimensional curved strips, three-dimensional curved strips, wavy patterned strips. The electrically conductive strips can also be aligned into any designed pattern as long as the two conductive strips 14a and 14b are located within the same horizontal plane within the intermediate layer. While it is understood that the term plane is a 2-dimensional concept, when referencing that the two conductive strips 14a and 14b are within the same horizontal plane within the intermediate layer, it is meant that if you take a horizontal planar cross-section through any portion of conductive strip 14a while sensor 10 is at rest, it will be within the same horizontal plane as conductive strip 14b. Stated another way, if 14a exists in a cross-sectional horizontal plane, a portion of 14b will also exist on that same plane when sensor 10 is at rest.

Conductive strip 14a is connected to conductive strip 14b and to an impedance measuring device 18. In some embodiments the impedance measuring device also includes a source of power. In yet other embodiments, in addition to being connected to an impedance measuring device 18, the conductive strips 14a and 14b are also connected to a power supply (not shown). In some embodiments, the impedance measuring device is a voltage divider or potential divider, which includes a voltage source in series with a resistor. The impedance measuring device can be any such device known in the art. Impedance measuring devices work by applying a known or measured force to one or both of the two conductive strips 14a and 14b while simultaneously measuring the change in impedance of the portion of the intermediate layer 12 located within the same horizontal plane and between the two conductive strips 14a and 14b while sensor 10 is at rest. Then, the change in resistance or voltage is related back to the applied force. This relation back is then used to calculate a new, unknown force.

The embodiment in FIGS. 1A and 1B shows an intermediate layer 12 having two electrically conductive strips 14a and 14b located therein and located within the same horizontal plane as described above. Although this embodiment only shows two electrically conductive strips 14A and 14B, sensors of the present invention can have any number of electrically conductive strips located within intermediate layer 12. As shown in FIG. 1B, there needs to be some intermediate layer 12 located in the same horizontal plane and between the two conductive strips 14a and 14b such that the conductive strips 14a and 14b are not in direct contact with one another and are only connected through the impedance measuring device 18.

Sensor 10 formed by connecting the conductive strips 14a and 14b has better sensing capabilities for sensing, and differentiating between the application of normal force coming from various directions as well as the application of localized shear forces on sensor 10. The displacement and/or deformation of the portion of the intermediate layer 12 located in the same horizontal plane as and between the two conductive strips 14a and 14b is very sensitive to the changes in resistance. Any change in resistance of the conductive strips 14a and 14b are negligible when the resistance of the intermediate layer 12 is maintained to be much greater than that of the conductive strips 14a and 14b.

Figure 2A:
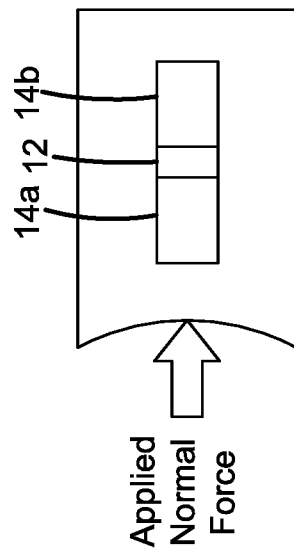
FIG. 2A shows the positioning of the conductive strips within a sensor at rest of the present invention.

FIG. 2A shows the positioning of the conductive strips 14a and 14b within a sensor 10 at rest of the present invention. Only the portion of intermediate layer 12 that is located in the same horizontal plane as and between the two conductive strips 14a and 14b is shown in FIGS. 2A, 2B, 2C, and 2D because this is the portion of intermediate layer 12 most sensitive to changes in resistance, but, intermediate layer 12 is also present in the areas immediately around the two conductive strips 14a and 14b.

Figure 2B:
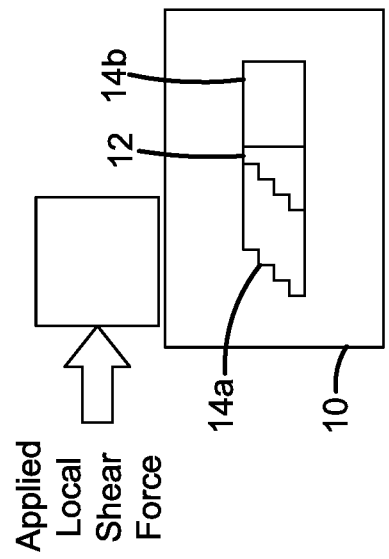
FIG. 2B shows the displacement/deformation of the sensor of FIG. 2A when a normal horizontal force is applied on one of the conductive strips.

FIG. 2B shows when a normal force is applied in a horizontal direction. As shown in FIG. 2B, a normal mechanism occurs between the two conductive strips 14a and 14b and the distance between the two conductive strips 14a and 14b is changed in the X direction, which induces a change in electrical resistance, which is called $\Delta R(2b)$.

Figure 2C:
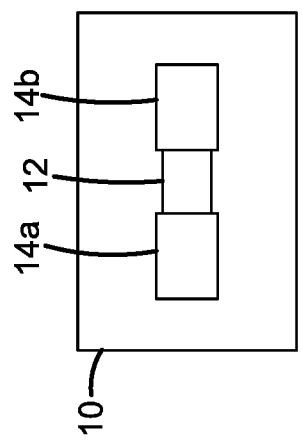
FIG. 2C shows the displacement/deformation of the sensor of FIG. 2A when a normal vertical force is applied on one of the conductive strips.

FIG. 2C shows when a normal force is applied in a vertical direction. As shown in FIG. 2C, a shear mechanism occurs between the two conductive strips 14a and 14b and the distance between the two conductive strips 14a and 14b is changed in the Y direction, which induces a change in the electrical resistance, which is called $\Delta R(2c)$ and wherein $\Delta R(2b)$ is greater than $\Delta R(2c)$.

Figure 2D:
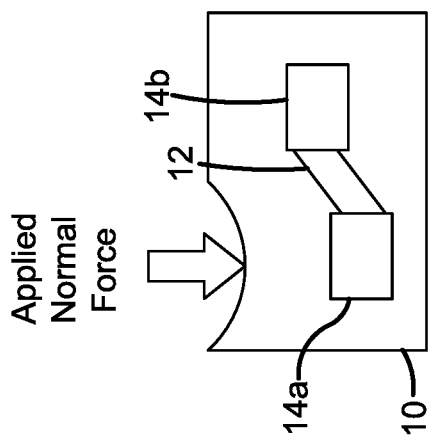
FIG. 2D shows the displacement/deformation of the sensor of FIG. 2A when a local shear force is applied on one of the conductive strips.

FIG. 2D shows when a localized shear force is applied on conductive strip 14a. A shown in FIG. 2D, a layered deformation occurs in conductive strip 14a, which induces a change in electrical resistance, which is called $\Delta R(2d)$ and wherein $\Delta R(2c)$ is greater than $\Delta R(2d)$. Therefore, $\Delta R(2b) > \Delta R(2c) > \Delta R(2d)$.

shows how the width w of the intermediate layer 12 changes when either a normal force or a shear force is applied to a sensor 10 of the present invention. As shown in FIG. 2, when a normal force is applied on sensor 10 (compression in this case), the displacement of the conductive strips 14a and 14b is normal to each other. However, when shear force is applied on sensor 10, the displacement of the conductive strips 14a and 14b is parallel to each other. Regardless of which type of force is applied, the deformation of intermediate layer 12 between the conductive strips 14a and 14b contributes to a change in the electrical resistance of the sensor, and dependent upon the type of force applied, either normal force in the form of tension or compression, or in the form of shear force, the sensor response is recorded and the data produced shows which type of force was applied and the amount of said force applied to sensor 10.

In some embodiments, there is only one insulating layer, and in other embodiments, there are multiple insulating layers. The insulating layer or layers are formed from non-conductive flexible material while the intermediate layer should have a conductivity of between about 50 MΩ and about 500 MΩ. The insulating layer(s) needs to be formed of a non-conductive material so that the insulating layer(s) do not interfere with the conduction of the conductive strips 14a and 14b, as will be appreciated to a better degree after further disclosures herein. In some embodiments, suitable materials for the insulating layers are selected from elastomers, polymers, and thermoplastics. In some embodiments, elastomers may be selected from polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorolastomers, polyether block amines, chlorosulfonated polyethylene, ethylene-vinyl acetate, thermoplastic elastomer, and polyurethane, or mixtures thereof. In one or more embodiments, the insulating layer(s) is made from polyurethane. When multiple layers are employed to create the sensor, the layers may be the same or different.

In some embodiments, intermediate layer 12 is formed from a conductive soft polymer material. The conductive soft polymer material can be selected from the group consisting of ionic liquid based soft polymers, particle based soft conductive polymers, and soft polymers having intrinsic conductivity. An example of a soft conductive polymers include carbon nanotubes (CNTs) in polydimethylsiloxane (PDMS) and an example of soft polymers having intrinsic conductivity include TangoPlus FullCure™ 930), polyacetylene, polypyrrole, polyaniline, and there copolymers. In one embodiment, the conductive soft polymer material of the intermediate layer is an ionic liquid based soft polymer.

Ionic liquids (ILs) are defined as a salt in the liquid state, consisting of ions and short-live ion pairs. IL's are a green media due to their superior characteristics of non-flammability, non-volatility, high ion conductivity, high thermal stability, and high chemical stability. When IL's are used in an embodiment, they are strictly restricted to salts whose melting points are relatively low, such as lower than about 100° C. In some embodiments the IL's are selected from 1-ethyl-3-methylimidazolium tetrafluoroborate (EMIBF4) with the Tg of −95.15° C.; 1-ethyl-3-methylimidazolium bis(trifluoromethylsulfonyl)imide (EMITFSI) with the Tg of −98.15° C.; and 1-butylpyridinium tetrafluoroborate (BPBF4) with the Tg of −66.7° C., which can be in-situ polymerizable. Higher ionic conductivity can be generated from high ion mobility, high ion density and low polymer glass transition temperature (Tg).

In one or more embodiments, the IL-polymer used as the intermediate layer comprise from 0.01 or more to 10 or less weight percent (wt %) IL based upon the total weight of the polymer used in the intermediate layer, in another embodiment, from 0.05 or more to 7.5 or less wt % IL, in another embodiment, from 0.5 or more to 5 or less wt % IL, and in yet another embodiment, from 1 or more to 2.5 or less wt % IL, based upon the total weight of the intermediate layer.

In one or more embodiments, the IL-polymer is also a pressure sensitive polymer.

Conductive strips 14a and 14b comprise conductive nanostructures dispersed in a flexible support material. As used herein, the term "conductive nanostructure" is meant to include conductive nanowires, carbon nanotubes (CNTs), and graphene. In one embodiment, the flexible support material is a polymer. The polymer may be virtually any flexible polymer. In some embodiments, the conductive strips have a width of from 5 microns or more to 3 mm or less. In some embodiments, the conductive strips have a width of from 10 microns or more to 2 mm or less. In some embodiments, the conductive strips have a width of 10 microns or more to 1 mm or less.

Embodiments of the present invention use CNTs for their mechanically strong, electrically conductive, and piezoresistive properties. The carbon nanotubes can be single-walled or multi-walled. Single-walled nanotubes are carbon nanotubes where the tube has only one layer. Multi-walled nanotubes are carbon nanotubes where the tube has more than one layer. These nanotube structures and additional nanotube structures are known by those skilled in the art.

In some embodiments, the CNTs have exceptionally high aspect ratios of from 500 or more to 1000 or less. In some embodiments, the CNTs have high Young's modulus of 0.64 TPa or higher. In some embodiments, the CNTs have a high stiffness of 1,000 GPa or higher. In some embodiments, the CNTs have high tensile strength of 100 GPa or higher. In some embodiments, the CNTs have a bulk density of 1.4 g/cm$^3$ or lower. In some embodiments, the CNTs have a bulk density in the range of about 0.15 g/cm$^3$ to about 1.3 g/cm$^3$. In other embodiments, the CNTs have the ability to withstand large strain rates of from 6% or more to 10% or less. In addition to their outstanding physical and mechanical properties, CNTs show exceptional electrical properties. Depending on their radius or chirality, CNTs can be metallic or semiconducting, and both are suitable for use in accordance with the present invention.

Metallic CNTs have exceptionally low electrical impedance of around 0.5Ω, and piezoresistivity (gauge factor around 600 to 1000 in a small scale). Dispersing CNTs into a polymer matrix reinforces the polymer in order to ameliorate the mechanical properties, and also embeds a highly conductive electrical element within the polymer.

The length of the CNTs can have an effect on the tunneling resistance of the conductive strips, and, for more sensitive sensors, it is preferred that the CNTs be short to produce more junctions between neighboring CNTs along the length of the strips. In some embodiments, the CNTs have an average length from 300 nanometers or more to 30 microns or less. In other embodiments, the CNTs have an average length from 500 nanometers or more to 20 microns or less. In other embodiments, the CNTs have an average length from 1 micron or more to 5 microns or less.

In some embodiments, the carbon nanotubes have a purity of more than 85 wt %, a diameter from 10 to 30 nm, and a length from 5 to 20 μm.

In one or more embodiments, the conductive structures are metal nanowires. The metal nanowires can be made from copper, silver, gold, or mixtures thereof. The metal nanowires can be made from any conductive metal that is known in the art as being able to form nanowires.

The length of the nanowires can have an effect on the tunneling resistance of the conductive strips, and, for more sensitive sensors, it is preferred that the nanowires be short to produce more junctions between neighboring nanowires along the length of the strips. In some embodiments, the nanowires have an average length from 300 nanometers or more to 30 microns or less. In other embodiments, the nanowires have an average length from 500 nanometers or more to 20 microns or less. In other embodiments, the nanowires have an average length from 1 micron or more to 5 microns or less.

The graphene additions are generally planar and will have length and width dimensions. In some embodiments, the length and width is from 300 nanometers or more to 30 microns or less. In other embodiments, the length and width is from 500 nanometers or more to 20 microns or less. In other embodiments, the length and width is from 1 micron or more to 5 microns or less.

The prepolymer used to form the carbon nanotube-filled polymer can be any stretchable prepolymer that is capable of mixing with carbon nanotubes and showing conductivity after mixing and curing. The prepolymer is mixed with carbon nanotubes before being polymerized to form the electrically conductive strips 14a and 14b.

The prepolymer is mixed with a curing agent in order to cure the solution into strips. The curing agent can be thermally initiated by adding heat, or can be initiated by light, such as with UV, visible, or infrared light, depending on the photoinitiator.

For ease of manufacture, in one or more embodiments, the prepolymer is a material that is photocurable or photocrosslinkable. Photocrosslinking properties provide a way to directly cure the deposited materials, whereas in the conventional direct write or printed electronics, a post-baking process is required. In one embodiment, the present invention provides a sensor wherein a post-baking process is not required.

In particular embodiments, the prepolymer is selected from the groups consisting of cyclic trimehylolpropane formal acrylate, Cyclic Trimehylolpropane Formal Acrylate mixed with Acrylate Ester, Tango Plus (a commercially available photocurable material from Objet Co.), and mixtures thereof.

In some embodiments, the prepolymer is selected from propoxylated neopentyl glycol diacrylate, propoxylated glyceryl triacrylate, aromatic urethane acrylate, urethane acrylate, cyclic trimehylolpropane formal acrylate, acrylate easter, aromatic monoacrylate, ethoxylated bisphenon a dimethacrylate, and mixtures thereof. In some embodiments, the prepolymer is selected from commercial 3D Printing photopolymers such as Objet TangoBlackPlus Fullcure980, TangoPlus FullCure930, TangoBlack FullCure970, and TangoGray FullCure950, and mixtures thereof.

In one or more embodiments, the prepolymer is prepared by blending a photoinitiator with a monomer or oligomer in order to aid in the process of photocuring the prepolymer. The photoinitiator may be chosen from 2,2-dimethoxy-2-phenylacetophenone, acyl phosphine oxides, bisacryl phosphine oxides, bis(2,4,6-trimethylbenzoyl) phenylphophine oxide, benzoin ethyl ether, 5,7-diiodo-3-butoxy-6-fluorone, and mixtures thereof. In one or more embodiments, commercial 3D printing photopolymers can be used without using a photoinitiator. In one or more embodiments, commercial 3D printing photopolymers are mixed with an additional photoinitiator when it they are mixed with a monomer or oligomer.

In one or more embodiments, the conductive strips comprise from 0.01 or more to 20 or less weight percent (wt %) nanostructures, in another embodiment, from 0.05 or more to 15 or less weight percent (wt %) nanostructures, in another embodiment, from 0.5 or more to 10 or less weight percent (wt %) nanostructures and in yet another embodiment, from 1 or more to 5 or less weight percent (wt %) nanostructures, based upon the total weight of the conductive strips.

In one or more embodiments, the conductive strips comprise 0.01 or more weight percent (wt %) nanostructures, in another embodiment, 0.05 or more weight percent (wt %) nanostructures, in another embodiment, 0.5 or more weight percent (wt %) nanostructures and in yet another embodiment, 1 or more weight percent (wt %) nanostructures, based upon the total weight of the conductive strips.

In one or more embodiments, the conductive strips comprise 10 or less weight percent (wt %) nanostructures, in another embodiment, 7.5 or less weight percent (wt %) nanostructures, in another embodiment, 5 or less weight percent (wt %) nanostructures and in yet another embodiment, 3 or less weight percent (wt %) nanostructures, based upon the total weight of the conductive strips.

Conductive strips 14a and 14b form the electrode of sensor 10 while intermediate layer 12 forms the sensing aspect of sensor 10. Impedance and voltage can be measured across the strips 14a and 14b and intermediate layer 12, by the impedance measuring device 18. Strip 14a, intermediate layer 12 and strip 14b form a series circuit. The measuring device 18 measures impedance and voltage within the circuit.

In one embodiment, sensor 10 of the present invention can be biomimetic in the sense that they can have mechanical compliance similar to human fingertips. Sensor 10 can also be used to detect force at distinct locations of applied pressure and slip. Furthermore, by examining the relative timing of the force signals from adjacent conductive strips, multiple sensors 10 can be used to detect slip and the direction that slip occurs. This is similar to the way that people can determine the direction that forces are applied through the relative timing of action potentials from mechanoreceptors within the fingertip.

The principle for detecting slip is based on the fact that high frequency mechanical vibrations occur when one object slips against another object. Different objects exhibit different vibrations in the frequency domain. Pressing an object against the surface of a tactile sensor (without slip) and sliding the same object against the surface of the sensor (to simulate slip) results in a difference in frequency. The difference in the frequency domain between these two tactile events can be characterized with a fast Fourier transform (FFT). The FFT can be performed with signal processing software on the raw, unfiltered voltage recorded from the output of the voltage divider to illustrate the differences between the slip and nonslip events in the frequency domain.

Sensors of the present invention can also distinguish between slip and nonslip events. In one embodiment, sensors of the present invention allow the force to be measured at distinct locations on the surface of the sensor with low cross talk.

Figure 3:
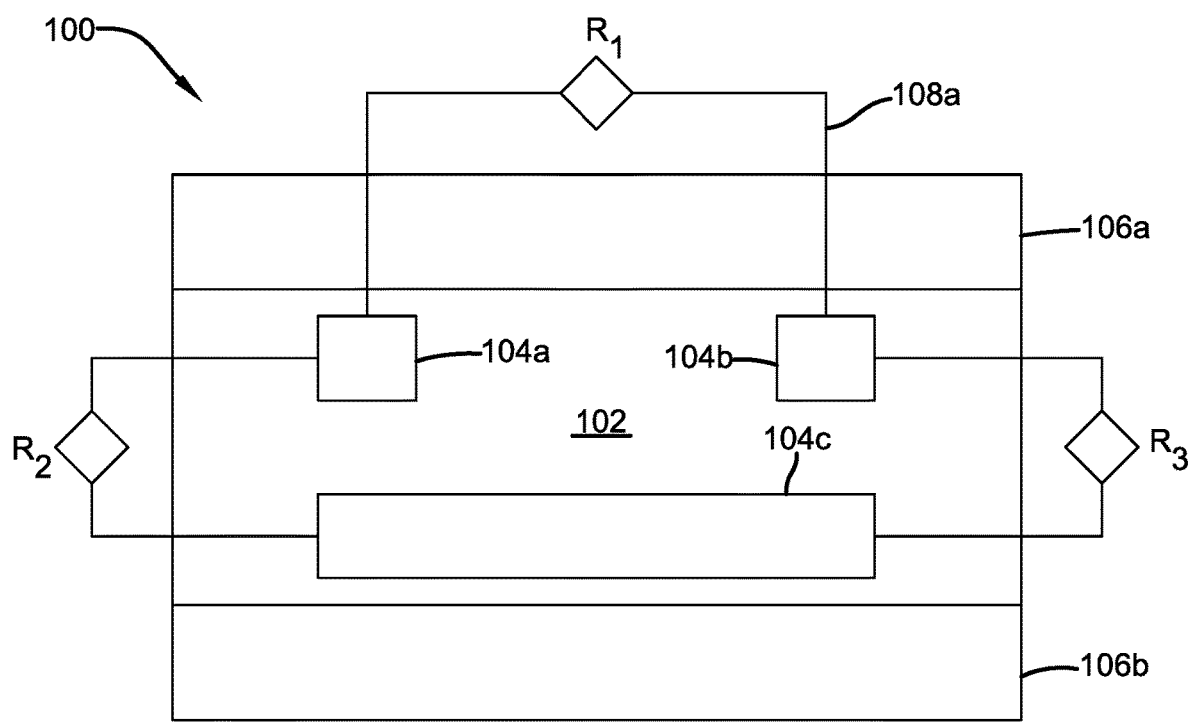
FIG. 3 is a side schematic view of one embodiment of a tactile sensor of the present invention comprising two insulating layers, two conductive strips located within one horizontal plane of an intermediate layer positioned between the two insulating layers, and a third conductive strip located within a second horizontal plane of the intermediate layer.

By having different configurations of conductive strips with the intermediate layer of the sensor, many different sensing mechanisms can be implemented. FIG. 3 shows a sensor 100 comprising two insulating layers 106a and 106b, an intermediate layer 102, two electrically conductive strips 104a and 104b are located within one horizontal plane within the intermediate layer 102, and a third conductive strip 104c is located in a lower horizontal plane within the intermediate layer 102. A first impedance measuring device 108a is connected between conductive strips 104a and 104b, a second impedance measuring device 108b is connected between conductive strips 104a and 104c, and a third impedance measuring device 108c is connected between conductive strips 104b and 104c. When a force is applied to the sensor, the relative distances between the various conductive strips will change, resulting in changes in resistance with the intermediate layer 102. By comparing the changes in resistance recorded by each impedance measuring device 108a, 108b, and 108c, the type and amount of the force applied to the sensor 100 can be determined.

Resistance $R_1$, $R_2$, and $R_3$ will all change under an applied force. The value of $\Delta R_1$, $\Delta R_2$, and $\Delta R_3$ will indicate the angle of the applied force. Normal displacement of electrodes will create a higher change in resistance. So if $\Delta R_2$ is higher than $\Delta R_1$, it will indicate that the normal component of the applied force is higher than the shear component of the applied force.

Although the sensors embodied in FIG. 1 through FIG. 3 are generally rectangular, sensors of the present invention can take any shape. Sensors of the present invention can be cylindrical, conical, spherical, or combinations thereof. Sensors of the present invention can take any designed three-dimensional shape.

One embodiment of the present invention provides a method of producing a tactile sensor by locating two electrically conductive strips within the same horizontal plane within a conductive soft polymer layer. In a particular embodiment, a tactile sensor is produced by first preparing a first layer that includes insulating elastomeric or soft polymer material. The next step includes preparation of a second layer that includes conductive soft polymer material and at least two electrically conductive strips. In a final step, a third layer is prepared that includes insulating elastomeric or soft polymer material.

In one or more embodiments, the step of preparing a second layer includes laying down a conductive soft polymer material so as to fully cover the first layer of insulating elastomeric or soft polymer material, then locating within the same horizontal plane of the conductive soft polymer material at least two electrically conductive strips. In other embodiments, the step of preparing a second layer includes laying down at least two electrically conductive strips over the first layer of insulating elastomeric or soft polymer material, then covering the at least two electrically conductive strips with a conductive soft polymer material.

In one or more embodiments, the first layer of insulating elastomeric or soft polymer material is formed by placing an appropriate elastomeric material into a mold to form the first layer. This first layer is then cured to set its form.

In one or more embodiments, the first layer of insulating elastomeric or soft polymer material can be formed using any curable elastomers in ambient conditions. In one or more embodiments, the first layer of insulating elastomeric or soft polymer material can be formed at room temperature and without the use of a vacuum.

After formation of the first layer, in one or more embodiments, an insulating elastomeric or soft polymer material is laid down in a first step of creating the second layer. Preferably the second intermediate layer has a thickness/height from at least about 100 microns or more to at least about 5 mm or less, in other embodiments, from at least about 1 mm to at least about 5 mm and, in other embodiments, from at least about 1 mm or more to at least about 2 mm or less.

In one or more embodiments, after laying down the insulating elastomeric or soft polymer material, the next step in creating the second layer is too position at least two conductive strips within the same horizontal plane within the insulating elastomeric or soft polymer material of the second layer. The at least one conductive strip comprise conductive nanostructures dispersed in a flexible support material. The conductive nanostructure is selected from the group consisting of include conductive nanowires, carbon nanotubes (CNTs), graphene, and or combination thereof. First, the flexible support material and the conductive nanostructure mixture must be made. The flexible support material comprises a combination of suitable prepolymer and a photoinitiator. The conductive nanostructure/flexible support mixture is formed by combining the selected conductive nanostructure with the selected prepolymer and photoinitiator where necessary. The mixture is then mixed until the conductive nanostructure is sufficiently dispersed within the flexible support mixture.

In one embodiment, the photoinitiator is first blended with the prepolymer using a magnetic stirrer. Then, the selected conductive nanostructures are dispersed into the prepolymer solution.

In one or more embodiments, the mixture is sonicated to improve the dispersion of the selected conductive nanostructure. During sonication, ultrasound propagation in the solution results in growth of cavities. The implosion of these cavities leads to violent and localized release of energy which can separate and disperse individual conductive nanostructures from bundles and agglomerates, where cavitation and wave propagation are directly related to the viscosity of liquid. Non-uniform energy release distribution during sonication leads to weak and non-homogeneous dispersion especially in medium to high viscosity liquid. A combination of a sonicator and magnetic stirrer can be used to globally disperse the conductive nanostructures in the prepolymer. In one or more embodiments, the prepared solution can be degassed under a vacuum. In one embodiment, the solution is degassed for 5 hours. In some embodiments, the mixture is sonicated (Q700, Qsonica, Newtown, Conn.) for 90 min and filtered using a 200 micron filter (Sterlitech, Kent, Wash.).

The conductive strips can be positioned within the same plane within the second intermediate layer using any technology known in the art. The conductive strips are ultimately cured and can be cured by any technology known in the art. In one or more embodiments, the deposited materials are directly cured. In one or more embodiments, the conductive strips are cured using UV, visible, or infrared light depending on the photoinitiator selected. Other methods of curing the conductive strips include thermal curing using a thermal initiator, such as 2,2'-azobis(2-methyl-propionamidine)dihydrochloride, 2,2'-azobis(2-methylpropionitrile), benzoyl peroxide, and mixtures thereof.

In one embodiment, the conductive strips are located within the same plane within the second intermediate layer using direct-write technology. Direct-write (DW) technology is a maskless process to create conductive patterns on virtually any surface. With this technology, translation mechanisms are utilized to position a dispensing head to extrude a conductive material which forms a functional wire pattern.

A direct-write system comprises a micro-dispensing tip and a means for directly curing the dispensed material. Direct-write applications include robotic tactile sensors and soft molding.

In one embodiment, sensors of the present invention are prepared by a computer controlled DW system using a screw-driven micro-dispensing head (PCD3, GPD Global, Grand Junction, Colo.) installed on a high precision xyz translation stage with a 500 nm resolution (Aerotech, Pittsburg, Pa.). Then, a four-leg optical fiber with a high-power UV lamp (OmniCure S2000, Lumen Dynamics Group Inc., Ontario, Canada) can be installed around the dispensing head to directly cure the dispensed material.

One schematic of the developed DW system comprises the xyz stage, micro-dispensing device, and curing system. Controlling the speed of the xyz stage, the gap distance between the tip and substrate, and the dispensing speed regulated by the input voltage of the dispensing head can be used to form a precise and consistent shape of deposited sensor elements.

In one or more embodiments, the electrically conductive strips or wires possess a consistent width throughout the length of each strip. Dispensing parameters directly affect the size and resolution of the dispensed material. Several parameters affect the ability to maintain continuous and smooth flow of the material delivered from the dispensing tip to the substrate surface. The width of the strips decreases as the flow rate increases and too low flow rate does not create consistent and continuous line widths. Another parameter is the translation speed. Translation speed is the speed of the stage underneath the dispensing tip. In one embodiment the translation speed is from 20 mm/sec or more to 30 mm/sec or less. In one embodiment the translation speed is 15 mm/sec or more and in other embodiments the translation speed is 35 mm/sec or less. High flow rates and slow translation speeds result in inconsistent line widths of conductive elements. Excessively fast translation speed and slow fluid flow rate also creates discontinuous or inconsistent line widths.

Variation of the gap distance between the tip and the substrate also causes inconsistent line widths. Where polyurethane material is used as the substrate, the surface is flexible with a relatively broad surface area. Here, small variations in gap distance are unavoidable. However, the use of a highly accurate and uniform substrate and/or real-time distance measurement device installed in the dispensing head would be a method to reduce this variation in gap distance, thereby giving more consistency to the line width.

Material agglomeration generated during the dispersion process is another source of line width variation. The agglomerated material sometimes partially occluded the tip and resulted in a pressure change in the tip. This pressure change caused inconsistent line widths. The material agglomeration can be improved by using a better material dispersion process and chemicals such as surfactants and/or dispersants.

Several sets of preferred parameters can be chosen to achieve consistent line widths. In one embodiment, the parameters are a flow rate from about 0.16 ml/V·min or more to 0.18 ml/V·min or less, translation speed of about 20 mm/s, and a line width of about 0.8 mm.

After curing the at least one conductive strip, the conductive intermediate polymeric material is cured to form the second intermediate layer.

After curing the second intermediate layer, the third layer including an insulating elastomeric or soft polymer material can be formed using any curable elastomers in ambient conditions.

This material design enables the fabrication of mechanically compliant and electrically conductive tactile sensors. Advantageously, tactile sensors of the present invention are mechanically compliant to facilitate delicate grasping procedures and to be more suited for a wider range of applications.

Sensors of the present have many beneficial applications. These applications include any robotic system where control of force is required (e.g. assembly lines), diagnostics (e.g. determining if antilock brakes prevent slip), prosthetic limbs, conformal or wearable electronics (e.g. head-band thermometer), biomedical instruments and measurement (e.g. foot pressure measurement for customized shoes, body-type collection chair, bedsore-free bed), electronics embedded in structural components, and implantable electronics with biocompatible materials.

In light of the foregoing, it should be appreciated that the present invention significantly advances the art by providing an improved and flexible tactile sensor that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A tactile sensor comprising:
 a first insulating layer formed from a non-conductive material;
 an intermediate layer of conductive soft polymer material having first and second electrically conductive strips located within a first horizontal plane within the intermediate layer and wherein said intermediate layer is positioned above said first insulating layer; and
 a second insulating layer formed from a non-conductive material positioned above said intermediate layer, wherein both the first and second electrically conductive strips are connected to a first impedance measuring device, wherein the conductive soft polymer material is selected from the group consisting of ionic liquid polymers, particle based soft conductive polymers, and soft polymers having intrinsic conductivity.

2. The tactile sensor of claim 1, wherein said first and second electrically conductive strips include conductive nanostructures dispersed in a flexible support material, wherein said conductive nanostructures are selected from the group consisting of conductive nanowires, carbon nanotubes, and graphene, and wherein said carbon nanotubes are selected from the group consisting of multi-walled carbon nanotubes or single wall carbon nanotubes.

3. The tactile sensor of claim 2, wherein said electrically conductive strips contain from 0.01 wt % to 20 wt % carbon nanotubes and wherein said carbon nanotubes have an average length from 300 nanometers to 30 microns.

4. The tactile sensor of claim 1, wherein the conductive soft polymer material is an ionic liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl) imide (EMITFSI) with the Tg of −98.15° C.; and 1-butylpyridinium tetrafluoroborate (BPBF4) with the Tg of −66.7° C.

5. The tactile sensor of claim 4, wherein the weight percent of the ionic liquid based upon the total weight of the ionic liquid polymer within the intermediate layer is selected from the group consisting of from 0.01 or more to 10 or less weight percent (wt %) of ionic liquid, from 0.05 or more to 7.5 or less weight percent (wt %) ionic liquid, from 0.5 or more to 5 or less weight percent (wt %) ionic liquid, and from 1 or more to 2.5 or less weight percent (wt %) ionic liquid.

6. The tactile sensor of claim 4, wherein the ionic liquid polymer is a pressure sensitive polymer.

7. The tactile sensor of claim 1, wherein the impedance measuring device is a voltage divider.

8. The tactile sensor of claim 1, wherein said first insulating layer and said second insulating layer is stretchable.

9. The tactile sensor of claim 1, wherein the non-conductive material of said first insulating layer and the non-conductive material of said second insulating layer are selected from the group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorolastomers, polyether block amines, chlorosulfonated polyethylene, ethylene-vinyl acetate, thermoplastic elastomer, polyurethane, and mixtures thereof, and wherein the non-conductive material of said first insulating layer can be the same or different than the non-conductive material of said second insulating layer.

10. The tactile sensor of claim 1, wherein the tactile sensor detects:
 a. applied force such as normal and shear forces,
 b. the proximity of the applied force,
 c. slip events,
 d. slip direction,
 e. slip speed,
 f. slip velocity,
 g. temperature changes,
 h. rolling contact,
 i. the shape of an object in contact with said tactile sensor, and
 j. vibration.

11. The tactile sensor of claim 1, further comprising a third electrically conductive strip located within the intermediate layer, wherein said third electrically conductive strip is located within a second horizontal plane, and wherein said second horizontal plane is different than said first horizontal plane.

12. The tactile sensor of claim 11, wherein said first electrically conductive strip and said third electrically conductive strip are connected to a second impedance measuring device and wherein said second electrically conductive strip and said third electrically conductive strip are connected to a third impedance measuring device.

13. A method of making a tactile sensor, comprising:
(a) preparing a first layer by pouring a first insulating soft polymer formed from a non-conductive material into a first mold;
(b) curing the insulating soft polymer to form the first layer;
(c) preparing a second layer by:
  (i) depositing a mixture of prepolymer and carbon nanotubes into a second mold on top of the first layer to form a first array of conductive strips;
  (ii) curing the first array of conductive strips;
  (iii) pouring a conductive soft polymer material into the second mold to cover the first array of conductive strips;
  (iv) curing the conductive soft polymer material to form the second layer;
(d) preparing a third layer by pouring a second insulating soft polymer formed from a non-conductive material into a third mold on top of the second layer;
(e) curing the second insulating soft polymer to form the third layer; and
(f) connecting a first conductive strip and a second conductive strip of the first array of conductive strips to a first impedance measuring device, wherein the conductive soft polymer material is selected from the group consisting of ionic liquid polymers, particle based soft conductive polymers, and soft polymers having intrinsic conductivity.

14. The method of claim 13, wherein the mixture of prepolymer and carbon nanotubes is deposited via a microdispensing head, or screen printing and wherein the deposited mixture is directly cured into strips using UV light or thermal curing.

15. The method of claim 13, wherein the conductive soft polymer material is an ionic-liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl)imide (EMITFSI) with the Tg of −98.15° C.; and 1-butylpyridinium tetrafluoroborate (BPBF4) with the Tg of −66.7° C.

16. The method of claim 13, wherein the non-conductive material of said first insulating soft polymer and the non-conductive material of said second insulating soft polymer are selected from the group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorolastomers, polyether block amines, chlorosulfonated polyethylene, ethylene-vinyl acetate, thermoplastic elastomer, polyurethane, and mixtures thereof, and the non-conductive material of said first insulating soft polymer can be the same or different than the non-conductive material of said second insulating soft polymer.

* * * * *